UNITED STATES PATENT OFFICE.

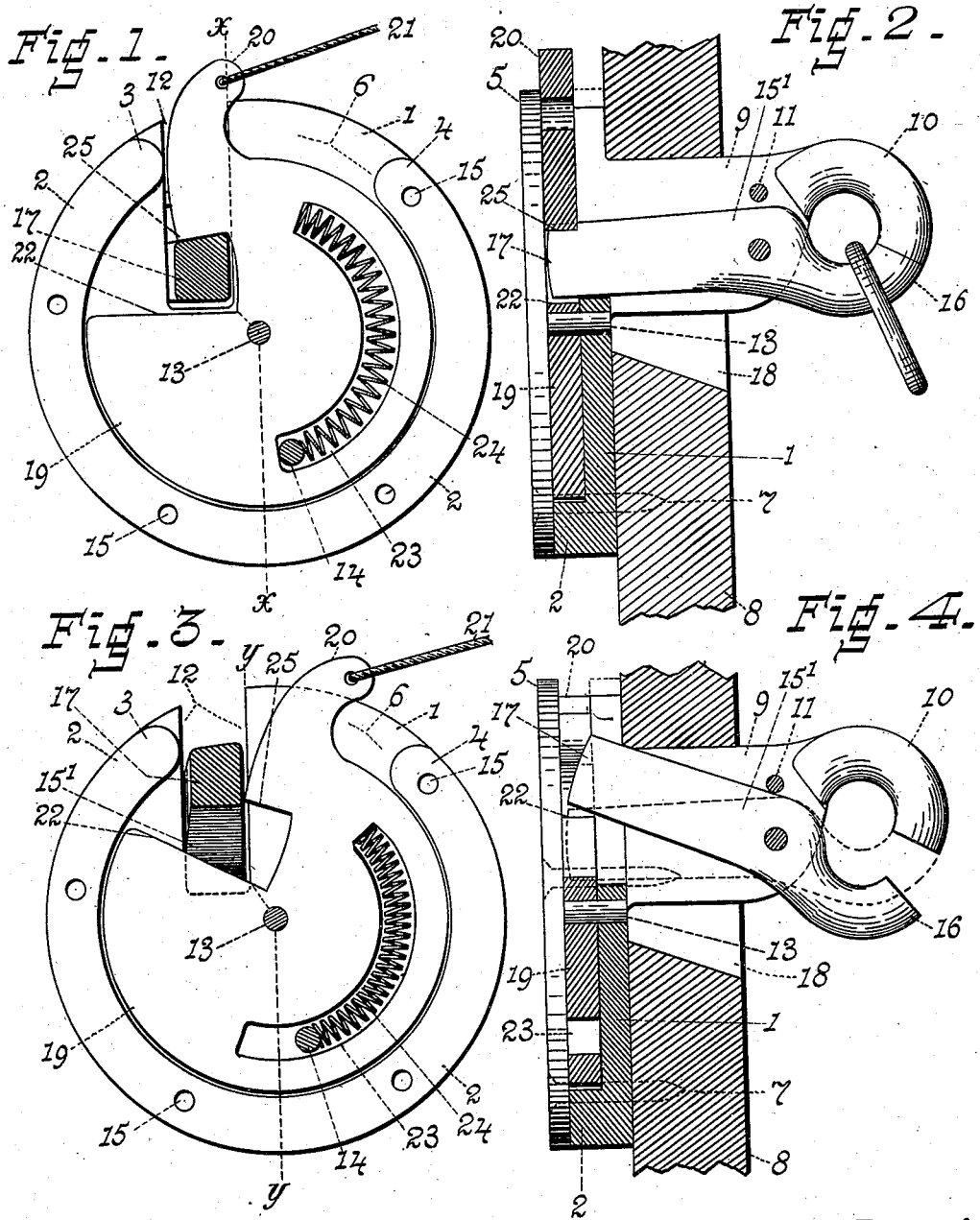

PATRICK FRANCIS MORRISSY, OF AUBURN, NEW YORK, ASSIGNOR OF ONE-HALF TO EARL N. ELLIOTT, OF AUBURN, NEW YORK.

HORSE-RELEASER.

No. 858,890.  Specification of Letters Patent.  Patented July 2, 1907.

Application filed May 22, 1906. Serial No. 318,272.

*To all whom it may concern:*

Be it known that I, PATRICK FRANCIS MORRISSY, a citizen of the United States, residing at Auburn, in the county of Cayuga and State of New York, have invented new and useful Improvements in Horse-Releasers, of which the following is a specification.

My invention relates to improvements in so-termed horse releasers whereby the horses hitched in fire, police patrol, ambulance and similar quarters, can be released through their hitch-straps, automatically, on the sounding of an alarm or emergency call, the object being to provide a simple device at a moderate cost, and one that at all times will be absolutely practical and simply operative while not liable to become disarranged or worn through use.

The improvement is fully illustrated in the accompanying drawings comprising four separate figures, to which reference will be made in the description of the same which follows, and of which:

Figure, 1, shows the internal structure of the horse-releaser,—the cover of the same being removed for that purpose,— the several operative parts being seen in the position they assume when the hook of the releaser is hooked over the ring of the tie-strap or otherwise, of the horse secured thereby. Fig. 2, is a vertical section of Fig., 1, taken approximately on the dotted line $x-x$, showing the cover piece thereon and the whole secured in proper working position on a section of the horse-stall. Fig., 3, shows the horse-releaser, with the cover of the same removed, exposing the internal mechanism, with the several parts in the position they assume when the hook is thrown open to release the ring of the tie-strap, or otherwise, by which the horse is secured, and: Fig., 4, is a vertical sectional view of Fig., 3, taken approximately on the line $y-y$, (shown dotted) with the cover piece in place, and the whole secured in proper working position on a section of the stall.

In the drawings similar figures for reference refer to similar parts.

Referring to Fig., 1, a case or box 1, is provided in which is carried the several parts which serve to operate the release. Preferably it is of circular form as being more symmetrical and compact, although other forms may be had if so desired. The box or case 1, is provided on one side with a raised rim 2, which is stopped at the points 3, and 4, as seen in Figs., 1, and 3. On the outer side of the rim 2, rests a cover 5, (see Fig., 2,) which when in place covers and protects the interior mechanism, and assists in forming a slot 6, in the periphery of the box or case 1, the object of which will be presently explained. Screws 7, seen in doted lines in Figs., 2, and 4, serve to secure the box or case and the cover to each other and the whole to the side of the stall as seen in section at 8, in Figs., 2, and 4. The said box or case 1, is extended at its rearward side into a fixed arm 9, which terminates in a hook 10, and is also provided with a stop-pin 11. The said box or case 1, is further provided with a vertical slot 12, a central post 13, and an inside stop-pin 14. Holes 15, are provided through the raised rim 2, of said box or case 1, which correspond with like holes formed through the cover 5, in which pass bolts or screws for fastening the whole together and securing it in the position as shown at any convenient point of the stall.

An arm $15^1$, which terminates outwardly in a hook 16, is pivoted at the proper point on one side of the fixed arm 9, extended from the box or case 1. Its opposite end 17, is carried through the vertical slot 12, into the case 1, as shown in Figs., 2, and 4. An opening 18, is formed through the stall section 8, for the passage of the fixed arm 9, and the pivoted arm $15^1$, the said opening being of sufficient size so it may not obstruct the action of the said pivoted arm $15^1$.

An actuating disk or tumbler 19, is carried in the box or case 1, and it turns on the center post 13, referred to. It is upwardly extended through the slot 6, between the end points 3, and 4, of the rim 2, into an arm 20, to the end of which is hooked or otherwise attached an operating cord 21, as shown in Figs., 1, and 3. It also is provided with a bearing edge 22, which, when the said tumbler 19, is in a position for release, passes directly under the end 17, of the pivoted lever $15^1$. This bearing edge 22, is extended sufficiently so as to afford a locking point 25, near the bottom of the arm 20, of the tumbler 19, which, when the hook 16, of the pivoted arm $15^1$, is shut against the hook 10, of the fixed arm 9, will rest on the upper side of the inner end of the pivoted arm $15^1$, and lock it in that position. It is also furnished with a curved slot 23, which is struck from the center-post 13, and in which is suitably fixed to the inside of the box or case 1, the stop-pin 14, referred to, and a spiral spring 24, one end of which bears against the upper terminal of said curved slot 23, and the other end against the said stop-pin 14, as clearly seen in Figs., 1, and 3.

As has been mentioned it will be seen by referring to Figs., 2 and 4, that the cover-piece 5,—when in position on the rim 2, of the box or case 1, and the whole fastened in place on the stall,—completely hides and protects the inside working parts of the box or case, so they cannot be tampered with or otherwise disarranged from their proper working functions.

In Fig., 2, the releaser is shown in the position the several parts assume when the hooks are holding the ring of the tie-strap of the horse. On the turning in of an alarm or otherwise when instant release is required, the operator gives a quick pull on the operating cord 21, against the arm 20, of the tumbler 19. This turns the said tumbler on the center-post 13, against the spiral spring 24, and at the same time the bearing edge 22, of said tumbler 19, throws up the inner end of the pivoted arm 15¹, against the stop-pin 11, arranged on the fixed arm 9, of the case or box 1, opening the hook 16, away from the hook 10, of said fixed arm thus releasing the ring of the tie-strap or otherwise of the horse. On the release of the tension or pull on the said operating cord, the tendency of the arm 20, of the tumbler 19, is to be thrown back to its original position through the influence of the spiral-spring 24, and of the end 17, of the pivoted arm 16, also to fall to its first position. However, before the end 17, of said pivoted arm 16, can fall, it is wedged between one side of the vertical slot 12, of the box or case 1, in which it operates, and the corner of the locking-point 25, of the tumbler 19, as plainly shown in Fig., 3. In this latter position the releaser may be left, the hook 16, being opened away from its fellow hook, ready for the insertion of the ring of the tie-strap or otherwise of the horse which on being done the hook 16, is pressed by the fingers of the operator up and against the hook 10, of the fixed arm 9, the tumbler flying to its first position and locking the pivoted lever in place as described and once more the ring of the tie-strap or otherwise of the horse is secured between the said hooks.

Having thus described the several parts of my improvement and their mode of operation, what I claim as new and desire to secure by Letters Patent of the United States is:

1. In a horse releaser a box or case carrying a fixed arm having a stop-pin and a hook, a movable arm pivoted on said fixed arm also having a hook, combined with a locking disk or tumbler carried in said box or case and having an opening to receive the end of said pivoted arm and a slot, a spiral spring carried in said slot between the sides of said box or case adapted to throw said locking disk or tumbler into action with the end of said movable arm, and means for operating said disk or tumbler conversely, and a cover on said box or case substantially constructed and arranged in the manner and for the purpose herein described and shown.

2. In a horse releaser a box or case carrying a fixed arm having a stop-pin and a hook, a rim extending around a portion of said box or case, a central post and an inside stop-pin, combined with a movable arm pivoted on said fixed arm and also having a hook at one end the other end being extended into said box or case, a locking disk or tumbler carried in said box or case on said central post of the same and having an opening adapted to receive said extended end of said pivoted arm and an upwardly extended arm having a bearing edge or locking point, said locking disk or tumbler provided with a slot in which the inside stop-pin travels, a spiral spring disposed in said slot between one end thereof and the inside stop-pin, and a cover-piece for the said box or case with means for securing the whole together in working place substantially constructed and arranged in the manner and for the purpose herein specified and shown.

In testimony whereof I affix my signature, in presence of two subscribing witnesses.

PATRICK FRANCIS MORRISSY.

Witnesses:
CLARENCE G. ELLIOTT,
FRANK R. RATHBUN.